July 18, 1944.  E. S. HINELINE  2,353,893
SHUTTER MECHANISM FOR PHOTORECORDING AND OTHER CAMERAS
Original Filed April 10, 1940  2 Sheets-Sheet 2
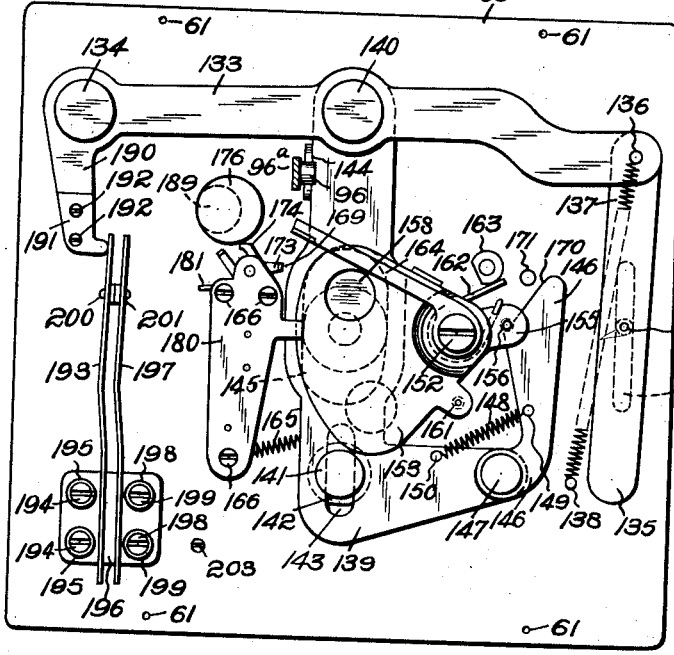
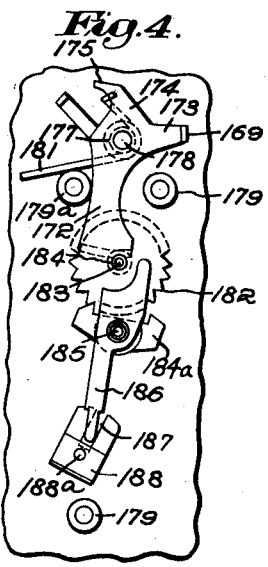
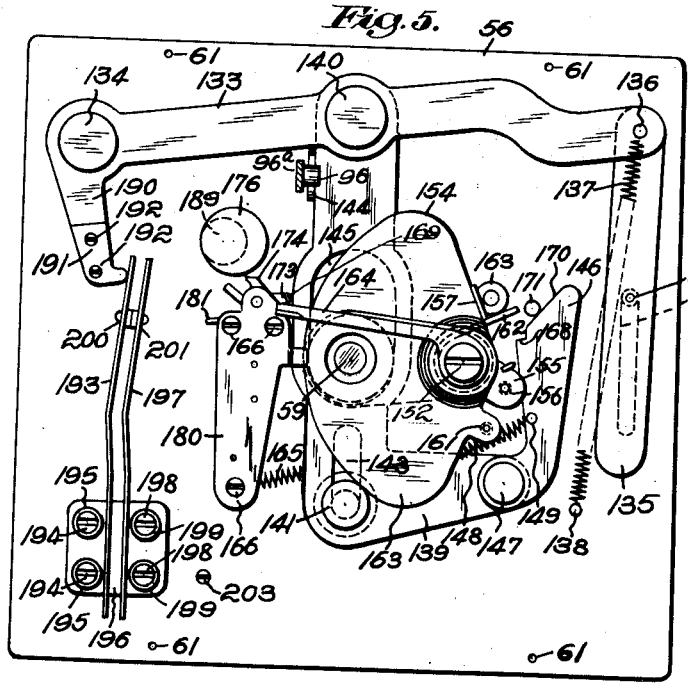
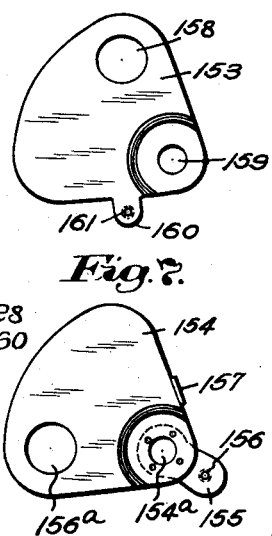
Inventor:
Edson S. Hineline.

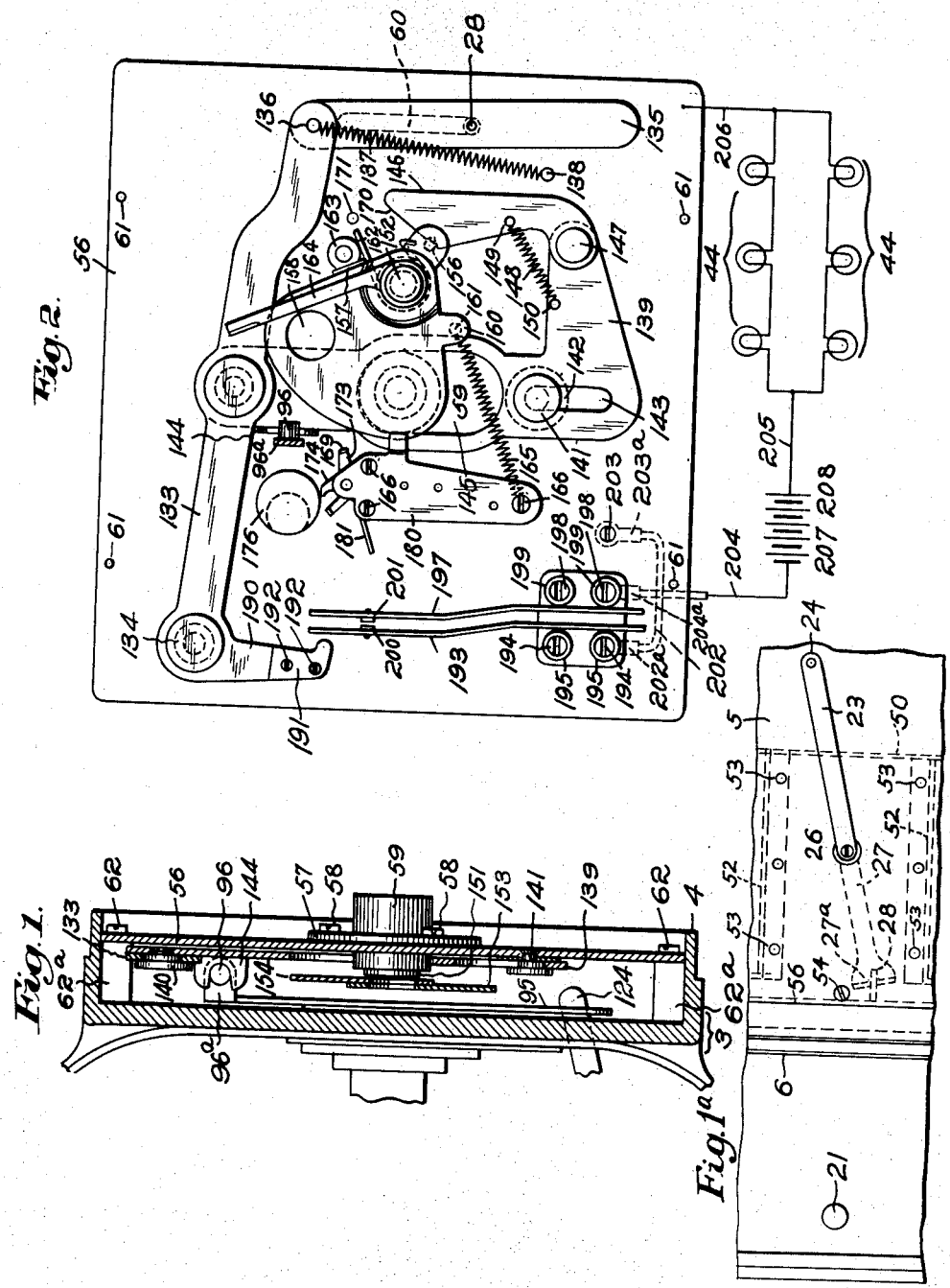

Patented July 18, 1944

2,353,893

UNITED STATES PATENT OFFICE 2,353,893

SHUTTER MECHANISM FOR PHOTORECORDING AND OTHER CAMERAS

Edson S. Hineline, Rochester, N. Y., assignor to The Folmer Graflex Corporation, Rochester, N. Y., a corporation of Delaware Original application April 10, 1940, Serial No. 328,868. Divided and this application May 16, 1941, Serial No. 393,785

19 Claims. (Cl. 95—60)

This application is a division of my co-pending application Ser. No. 328,868, filed April 10, 1940.

This invention relates to shutter mechanism for photorecording and other cameras.

In order that the principle of the invention may be readily understood, I have disclosed a single embodiment thereof in the accompanying drawings, wherein Fig. 1 is a partial, longitudinal, vertical section, with parts of the casing and magazine broken away, taken through a photorecording camera in which my invention may be used, and indicating parts of the shutter mechanism and closely related parts;

Fig. 1a is a broken away detail, partly in dotted lines, in side elevation of the hood-like part of the camera to show the shutter operating handle;

Fig. 2 is a plan view of the shutter operating mechanism of my invention, the camera being at rest and the lighting circuit of the camera being shown diagrammatically;

Fig. 3 is a plan view of the shutter operating mechanism, the shutter operating lever thereof being represented as in the position of operation just prior to an exposure;

Fig. 4 is a detail in side elevation of the slow-shutter-speed operating mechanism;

Fig. 5 is a plan view similar to Fig. 3, but representing the shutter release lever as having been operated, the first shutter leaf having been released and the second shutter leaf having been retarded by the slow-shutter-speed mechanism;

Fig. 6 is a side elevation of the second shutter leaf; and

Fig. 7 is a side elevation of the first shutter leaf.

While my invention as to certain features thereof may be of general application, it will, without thereby entirely limiting it thereto, be described with particular reference to a photorecording camera of the type shown in my said application Ser. No. 328,868.

There is great need for a camera of the general type shown more completely in said application, and which can be used for photorecording different objects, such as electric meters, gas meters, labels or packages, and any other object having dimensions that correspond with or may be received within the opening or rim of the camera nose or hoodlike part that surrounds the lens case thereof, and carries the illumination means and certain other parts.

In Patent No. 1,963,095, issued June 19, 1934, and in Patent No. 2,034,441, issued March 17, 1936, to myself and William H. Petit as joint inventors, there is disclosed an automatic film camera or so-called Factograph camera which is motor driven and is particularly constructed for making successive exposures with great rapidity one after another, of objects closely positioned with respect to each other, as, for example, the readings of meters in telephone exchanges. The camera shown in said patents is particularly adapted to be operated by an external electrical current to which the camera might readily be plugged, in a manner fully described in said patents, the camera containing a motor electrically driven from said externally derived current, by which motor the film was fed and the shutter was operated.

The camera herein referred to and in part disclosed is more particularly applicable for the same general purpose but in situations where an external electric current is not available, and accordingly the camera herein disclosed in part is provided with a battery or batteries built thereinto, and by means of which not only is the film fed and the shutter operated, but the necessary illumination is provided when the exposure is made.

An important object of the present invention is to provide a camera of the described type, having a shutter of simple operation that is wholly automatic when the manual operating impulse is given and which is provided with means for automatically timing the length of the period of shutter-opening between wide limits, and which shutter mechanism may, as to features thereof, be also of general application, and another object is to control the illumination of the camera for exposure purposes from or simultaneously with the shutter operation, which is itself conjointly controlled by a single operating means, together with the feeding of the film. These and other objects of the invention will be readily apparent from the following description of the one embodiment thereof herein shown, but to which my invention is not specially limited.

The camera casing except as herein stated may be of any suitable character and shape. While in my said application Ser. No. 328,868, it is disclosed as in part of an approximately elliptical disk-like form to receive or to constitute the film magazine, and a part thereof has a rectangular rim to which a large hood-like part or member may be attached, and within which rim the film-operating means and the shutter and its operating means may be received, I have herein in Fig. 1 represented merely the mechanism housing part at 3, it having an outer rectangular rim 4 to which the said hood-like part may be attached, by being fitted over said rim 4 and secured thereto by any suitable means as by screws. In Fig. 1a I have represented in side elevation, in a broken away detail, a portion of the hood-like part 5 which is attached at 6 to the mechanism-housing part of the camera not herein necessary more fully to show. One member of the camera casing provides a magazine door which is furnished with a latch 21.

The said elliptical portion of the structure is of sufficient thickness between the walls of the two parts thereof to receive the magazine containing the unexposed film and the magazine to receive the exposed portion of the film therefrom, sufficient space being afforded in advance of said two magazines within said rim to receive the film-operating means and the shutter and the shutter mechanism.

In a wall of the hood-like part or member, I provide a shutter-operating and film-feeding lever 23 provided with a knob 24 for manual operation. Such lever 23 constituting a shutter operating and film feeding lever, which preferably operates all the functioning parts, is mounted on a shaft by means of a locking screw 26, to the opposite end of which shaft is also fast a second lever 27, indicated in dotted lines in Fig. 1a, having a forked end 27a to engage pin 28, it being positioned within said hood-like part and which operates said pin 28 shown in Figs. 2, 3 and 5, and which pin is connected to the shutter-mechanism, in a manner to be subsequently described.

Within the hood-like part or member are supported electric light bulbs diagrammatically indicated at 44 in Fig. 2 as part of an electric circuit, controlling means wherefor are shown in Figs. 2, 3 and 5, and will be subsequently more fully described. There is provided a suitable transverse partition 50 attached to the hood-like portion 5 of the camera by means of suitable rivets. In the hood-like portion 5 of the housing of the camera there are provided suitable battery shelves 52, 52 attached to the side walls of the hood-like portion of the structure by rivets 53, 53 and screws, one of which is shown at 54 to connect the hood-like structure 5 to the mechanism housing portion 3 about the rim 4 thereof. All of said hood-like structure 5 is received upon and secured to the rim 4 at 6 by a suitable number of said screws 54.

The camera is provided with a shutter plate 56 which is secured fixedly in position within and to the mechanism housing part 3 of the camera casing, as indicated in Fig. 1. It is shown upon a larger scale in Figs. 2, 3 and 5. The said shutter plate 56 has attached thereto the lens flange 57 by means of screws 58, 58. Into the lens flange 57 is screwed or otherwise secured a lens 59. The said shutter plate 56 is provided with a narrow vertical slot 60 to permit the vertical operating movement of the pin 28, shown in Figs. 2, 3 and 5 and previously referred to as operated by movement of a hand-actuated shutter-operating and film-feeding lever (not herein shown). The shutter plate 56 is also provided with a suitable number of holes 61 to receive screws for attaching the said shutter plate 56 within the mechanism-housing part 3 of the framing or housing.

It has been stated that the magazine-receiving portion of the camera is of the general shape of an elliptical disk of sufficient thickness to receive the film take-off and take-up magazines. From Fig. 1, it will be observed that forward of the two magazines and integral with the main body part thereof is the part of the camera casing which I term the mechanism-housing and which is indicated at 3 in Fig. 1. Within the same is supported the film-operating means and protruding through the front thereof is the lens 59 already referred to. From Fig. 1 the hood-like part of the structure has been omitted or removed.

The said shutter plate 56 is attached to the magazine-housing 3 by means of screws 62, 62 passing through the holes 61, which screws are threaded into the bosses 62ª, 62ª.

The means for feeding the film which is claimed in my co-pending application Ser. No. 392,464, now Patent No. 2,284,487, dated May 26, 1942, to which film feeding mechanism I will now briefly refer, is so associated in operation with the operation of the shutter and the furnishing of illumination that all parts of the camera function in unison and are intimately related in operation. For that purpose I refer to Fig. 1. Therein, a film-feed bar is indicated generally at 95, it having an operating stud 96 extending from a turned-down lip 96a.

The film-feed bar 95 is provided with suitable lengthwise slots receiving shoulder screws, and said bar is free to receive a lengthwise movement within the limits of said slots. As the bar 95 is moved lengthwise (downward viewing Fig. 1), its dogs engage perforations of the film-strip to move the same a suitable distance in a manner not herein necessary to refer to in detail. Preferably I provide means whereby a standard perforated film may on each downward stroke of the feed bar 95 be moved a distance equal to 1½ times the spacing of the film perforations, thus providing for a picture 1½ times greater than if the standard spacing or feeding were used.

A ratchet feed in the magazine may be operated by a lever having an arm 124 indicated in Fig. 1, which extends through a slot of the film-feed bar 95. For each cycle of movement of the film-feed dogs of the film-feed bar 95, the ratchet is advanced one tooth.

The said film-feed bar 95 is caused to be moved in an upward direction, viewing Fig. 1, by the operator when he manually manipulates the shutter-operating and film-feeding lever referred to, and the said film-feed bar 95 is caused to move in a downward direction viewing Fig. 1 by a spring (not herein shown).

I will now describe the shutter mechanism and an operating arm therefor, and for that purpose will refer particularly to Figs. 2 to 7. Making reference to Figs. 2, 3 and 5, therein is shown a lever 133 constituting a part of said shutter mechanism, by which the other parts of the shutter mechanism are operated, and which is attached to the shutter plate 56 by means of a shoulder rivet 134. To the opposite end of lever 133 is attached a sliding operating arm 135 by means of a rivet 136, and attached to the said sliding operating arm 135 is the operating pin 28 referred to previously.

The said lever 133 is caused to move in a clockwise direction under the influence of the coiled spring 137 attached to the rivet 136 and to a pin 138 on shutter plate 56. The pin 28 is engaged by an operating lever connected to the shutter operating or release and film-feeding lever already referred to, so that any motion of the said last mentioned lever is transmitted to the said operating arm 135, and thereby to the lever 137, of the shutter mechanism.

To the lever 133 is attached an L-shaped, pivoted lever-member 139 by means of a shoulder rivet 140. The lever-member 139 is guided on the shutter plate 56 by means of a shoulder rivet 141 and is suitably spaced therefrom by a spacing washer 142. The said lever-member 139 is provided with a longitudinal slot 143 which allows said lever 133 to be moved upon its pivot 134 to an extent equal to the length of the slot 143. The said lever-member 139 is provided with an upturned lip or prong 144 near the extreme left hand end thereof, viewing Figs. 2, 3 and 5. The said prong 144 engages the pin 96 of the film-feed bar 95, as indicated in Fig. 1.

Thus, any movement imparted to the pin 28 by movement of the shutter-operating and film-feeding lever is transmitted to the feed-operating bar 95 and causes film to be fed. The said lever-member 139 is also provided with a second larger slot 145 for the purpose of clearing the lens 59, which is indicated in dotted lines in said Fig. 2. Attached to the outer end of the said lever-member 139 is a shutter-operating lever-arm 146, attached to said lever-member 139 by a shoulder rivet 147. The said lever-arm 146 is caused to turn in a contraclockwise direction by means of a coiled spring 148 that is connected to a pin 149 on said lever arm 146 and to a pin 150 attached to the lever-member 139.

The said shutter plate 56 is provided with a boss 151, most clearly shown in Fig. 1. Riding upon a shoulder screw 152 threaded on the said boss 151 are shutter leaves or blades 153, 154, separately shown in Figs. 6 and 7 respectively. As shown in Figs. 2, 3 and 5, the shutter leaf 153 overlies the shutter leaf 154, so that only the leaf 153 is visible in Fig. 2. The said shutter leaf 154 is provided with an arm 155 having a pin 156, as best indicated in Fig. 7. The shutter leaf 153, as best shown in Fig. 6, is provided with a hole 158 to admit light to the lens 59 and has a hole 159 providing for a pivot for the shutter leaf on the shoulder screw 152, and the shutter leaf 154 also has a hole 156a for admitting light to the lens and is provided with an upturned lip 157. The shutter leaf 153 also has a laterally extending lip 160 provided with a pin 161. Around the boss 151 (best shown in Fig. 1) is placed a spring 162, one end whereof rests against the shutter stop 163. The other end of the said spring 162 is hooked around the shutter leaf extension, thus causing the said shutter leaf 154 to turn in a clockwise direction until the said lip 157 engages the stop 163. The upper shutter leaf 153 is also provided with a flexible arm 164 that extends from the pivot thereof, as clearly indicated in Figs. 2, 3 and 5. The said arm 164 is caused always to travel with the shutter leaf 153. A spring 165 is attached to the pin 161 of the shutter leaf 153 and to a screw 166 of the slow-shutter-speed mechanism, shown in detail in Fig. 4, so as to cause the shutter leaf 153 to turn in a clockwise direction until the foremost end of the said shutter leaf 153 engages the lip 157 of the shutter leaf 154.

If the pin 28, shown in Figs. 2, 3 and 5 as in the slot 60, is caused to move in an upward direction viewing said figures, it carries with it the lever 133, so that the same moves in a contraclockwise direction viewing said figures, and therefore moves upward the said L-shaped lever-member 139 with the shutter operating member 146, whereupon a notch 168 in the edge of the shutter-operating member 146, as indicated in Fig. 5, will engage the pin 156 of the shutter leaf 154, thereby causing it to turn in a contraclockwise direction. The shutter leaf 153 will also be caused to travel in a contraclockwise direction under the influence of the upturned lip 157 of the shutter leaf 154, as indicated in Fig. 3.

The arm 164 of the shutter leaf 153 will engage a dog 169 of the slow-shutter-speed mechanism, indicated in Fig. 4 and also at about the center of Fig. 2, thus momentarily holding the opening 158 of the shutter leaf 153 over the lens 59. As the motion of lever 133 is continued in a contraclockwise direction viewing Figs. 2, 3 and 5, the cam face 170 at the outer end of the shutter-operating member 146 will ride up on a pin 171 extending from the face of the shutter plate 56, so as to disengage the notch 168 of the said shutter-operating member 146 from the pin 156, thus allowing the shutter leaf 154 to return to the starting position. At such time the hole 158 of the shutter leaf 153 registers with the lens 59, and inasmuch as the shutter leaf 153 is at such time held up by the slow-shutter-speed mechanism, the said lens 59 will be uncovered, the shutter-mechanism being then in the position shown in Fig. 5, and exposure is made. The operator continues to hold the shutter-operating lever in a downward position until the shutter is closed, which action is signified by an audible signal or click.

The shutter-retarding mechanism is most clearly shown in Fig. 4, wherein a gear sector 172 is shown as having an arm 173 having an upturned end constituting the retarding dog 169 already referred to. The said gear sector 172 also has a second arm 174 provided with an inclined face 175 adapted to be engaged by the slow-speed timing cam 176, shown in Figs. 2, 3 and 5, and the pivotal support whereof will be hereinafter specified, when the function of the said cam will be stated.

The gear sector 172 is also provided with a hub 177 mounted on a pin 178, as clearly shown in Fig. 4. The shutter plate 56 is provided with three studs 179, 179, 179a, which serve as supports for the slow-shutter-speed mechanism, the cover whereof is indicated at 180, in Figs. 2, 3 and 5. The said stud 179a acts as a stop for the gear sector 172 when the latter has moved in a clockwise direction to the position shown in Fig. 4. A spring 181 is wrapped about the hub 177 and has a bent-over end which engages the arm 174 of the gear sector 172. The other end of the said spring 181 is held under tension against the said stud 179a, thus causing the gear sector 172 to turn in a clockwise direction.

A serrated or finely toothed wheel 182 is provided, having co-axial therewith a very small pinion 184, both mounted on a shaft 183 (Fig. 4). The pinion 184 engages the gear sector 172. Any motion of the gear sector 172 is transmitted to the finely toothed wheel 182 through the teeth upon the adjacent end of the gear sector 172, which mesh with the teeth of the pinion 184. An escapement 184a is mounted on a shaft 185 having an arm 186 engaging a slot 187 of a suitable inertia member 188. Any motion of the gear sector 172 causing the finely toothed wheel 182 to turn, will cause the said escapement 184 to rock back and forth, thus vibrating the inertia member 188 and accurately timing the motion of the gear sector 172.

Making reference now to Fig. 5, it will be observed that the shutter leaf 154 has returned to its starting position, thus uncovering the lens 59. The shutter leaf 154 is at such time being held in a position in which its opening 156a registers with the lens 59, thus uncovering the same. Inasmuch as the shutter leaf 153 is under tension of the spring 165, the shutter leaf 153 will move in a clockwise direction, carrying with it the arm 164 that, as previously stated, engages the upturned end or dog 169 of the arm 173 of the gear sector 172. The slow-shutter-speed mechanism is caused to operate, thus allowing said arm 173 to turn slowly in a contraclockwise direction until the said upturned end or dog 169 becomes disengaged from the shutter leaf arm 164, thus allowing the shutter leaf 154 to close. The retarding means is operated upon during the upward movement of arm 164. The shutter is being reset for operation when the shutter leaves 153 and 154 are moved in a downward direction.

The operator now allows the shutter-operating and film-feeding lever to return to its initial position under the influence of the spring 137, shown in Figs. 2, 3 and 5, and the slow-shutter-speed mechanism is caused to be restored to its initial position under the influence of the spring 181, shown in Fig. 4.

In order to vary the timing of the slow-shutter-speed mechanism, I have provided the eccentric 176, which, as already stated, engages the face 175 of the lever arm 174, thus limiting the motion in a clockwise direction of the gear sector 172. It will be evident that the greater the extent of the motion in a clockwise direction of the gear sector 172, the greater the length of time that is necessary for the slow-shutter-speed operating arm 164 of the shutter leaf 153 to be retarded by the upturned end 169 of the arm 173, because it will have to operate the gear sector 172 through a greater distance, corresponding, of course, to a greater length of time.

The said slow-speed timing cam 176, which is an eccentric, is provided with a slotted shaft 189 on the opposite side of the shutter plate 56 from that shown in Figs. 2, 3 and 5, thus providing a retarding means at the front of the camera for convenient access to the operator.

There will next be described the means whereby through the operation of the shutter mechanism and the film-feeding mechanism, illumination is provided while an exposure is being made and is then terminated so as to save current, and in doing so reference will particularly be made to Figs. 2, 3 and 5.

The lever member 133 is provided with an L-shaped end 190 having attached thereto a part or member 191 of insulating material by means of screws 192, 192. Attached to the shutter plate 56 is a long, contact, spring arm 193 held to the shutter plate 56 by screws 194, 194, it being insulated therefrom by insulating bushings 195, 195 and an insulating plate 196. A second long, contact, spring member 197 is provided and is held to the shutter plate 56 by screws 198, 198 and is insulated from the shutter plate 56 by insulating bushings 199, 199. The contact spring member 193 is provided with a contact point 200 and the contact spring member 197 is provided with a contact point 201.

When the shutter mechanism is operated as hereinbefore described, the said arm 190 of the lever-member 133 turns in a contraclockwise direction and the insulated part or member 191 pushes the spring contact member 193 carrying with it the contact point 200 until the latter touches the contact point 201 of the contact spring member 197, thus completing the lighting circuit, as indicated in dotted lines in Fig. 2. The said contact spring member 193 is connected to the shutter plate 56 by means of a wire 202 and a clip 202a and is grounded thereto by means of a screw 203 and terminal 203a. The contact spring member 197 is connected to the battery or batteries through one of the screws 198, wire 204 and terminal 204a. The batteries which are indicated at 207, 208 are connected to the suitable number of lamps diagrammatically indicated in Fig. 2 at 44, 44, which lamps are positioned in the camera housing. They are connected by wire 205 to the batteries 207, 208, and to the shutter plate 56 by wire 206.

As diagrammatically indicated in Fig. 2, the camera is equipped with two specially designed batteries made up of three cells each. The two groups of batteries are connected in series by means of a wire (not shown). The construction of the battery housing is such that the batteries are automatically connected when they are placed in their proper position, in any well known manner.

The film magazine is placed in the camera and the film is threaded through the film gate and then led into the take-up magazine. The cover member is replaced on the receptacle part of the casing (it having been removed for the introduction of the film and the threading up thereof), and the shutter-operating and film-feeding lever is worked back and forth by the operator about four or five times, so that an unexposed area of the film strip is certainly before the exposure aperture.

It is now merely necessary for the operator to hold the camera in such a position that the entire forward edge of the hood-like part (or the rim 4 if the hood-like part is not used) encircles the object to be photographed, such as a meter, a bank of meters, a register or the like. Then the shutter-operating and film-feeding lever is moved by the operator by its knob until the second shutter-click is heard and thereupon the operator releases his hold upon the shutter-operating and film-feeding lever, which is automatically returned to its starting position in a manner previously described, and this return movement at the same time advances a new picture area of the film.

It is evident that the operation of the disclosed mechanism is exceedingly simple and that satisfactory photographs will always be obtained because the shutter timing is controlled automatically, and the camera is provided with its own source of light, so that adequate illumination will always be provided.

The camera is relatively light in weight and is not equipped with a motor for operating the shutter, as shown in the said Patent No. 1,963,095, issued to myself and William H. Petit. Moreover, a standard film is preferably used in the camera, and the camera can be very quickly loaded and unloaded in daylight.

Having thus described a single embodiment of the invention, it is to be understood that although specific terms are employed, they are used in a generic and descriptive sense and not for purposes of limitation, the scope of the invention being set forth in the following claims.

I claim:

1. In a shutter movement for photographic cameras, a shutter plate whereon the operating parts are mounted and whereon is mounted a lens barrel, a pin 28 extending through an elongated opening in said shutter plate and connected to a manually operated part to be moved thereby, an upright, slidable, shutter-operating arm 135 moved by movement of said pin 28, a lever arm 133 extending in parallelism to and transversely of the face of said shutter plate and pivoted thereto and connected to said operating arm 135, and a lever member 139 pivotally connected to said lever arm 133 between its ends so as to be moved up and down in close parallelism to the face of the shutter plate, said lever member 139 having an opening therein surrounding the lens barrel, and at least one shutter blade pivotally mounted on said shutter plate and controlled in the movement thereof by said lever member 139, the means for so controlling the movement of the shutter blade including a lever arm 146 pivoted to said lever member 139 and having a formation to engage a formation on such shutter blade.

2. In a shutter movement for photographic cameras, a shutter plate whereon the operating parts are mounted and whereon is mounted a lens barrel, a lever 133 pivoted upon said shutter plate and extending transversely thereof in close parallelism thereto, a lever member 139 pivotally connected to said lever arm 133 to be moved up and down by said lever 133 and having an opening surrounding the lens barrel, at least one shutter blade pivotally mounted on the shutter plate and having a notch-engaging formation, and a shutter operating lever arm 146 pivoted to said lever member 139 and having a notch to engage said formation on such shutter blade, thereby to move said shutter blade, and means to release said lever arm 146 from said shutter blade to permit the latter to return to its starting position.

3. In a shutter movement for photographic cameras, a shutter plate whereon the operating parts are mounted and whereon is mounted a lens barrel, a lever 133 pivoted upon said shutter plate and extending transversely thereof in close parallelism thereto, a lever member 139 pivotally connected to said lever arm 133 to be moved up and down by said lever 133 and having an opening surrounding the lens barrel, two shutter blades 153, 154 co-axially pivoted on the shutter plate and each having an opening, a shutter blade 154 having a projection, a shutter operating lever arm 146 pivoted to the lever member 139 and having a notch 168 to engage said projection on the shutter blade 154 to move the latter, and means to release said lever arm 146 from said shutter blade to permit the latter to return to its starting position.

4. In a shutter movement for photographic cameras, a shutter plate whereon the operating parts are mounted and whereon is mounted a lens barrel, a lever member 139 mounted in close parallelism to said shutter plate and having means connected thereto to move it up and down in a plane close to said shutter plate, said lever member 139 having an opening surrounding the lens barrel, two shutter blades 153, 154 co-axially pivoted on the shutter plate and each having an opening, a shutter blade 154 having a projection, and a shutter operating lever arm 146 pivoted to the lever member 139 and having a notch 168 to engage said projection on the shutter blade 154 to move the latter, the said lever arm 146 having a cam face 170 to engage a pin on the said shutter plate so as to release the said lever arm 146 at the said notch 168 from the shutter blade 154.

5. In a shutter movement for photographic cameras, a shutter plate whereon the operating parts are mounted and whereon is mounted a lens barrel, a lever arm 133 pivoted upon said shutter plate and extending transversely thereof in close parallelism thereto, a lever member 139 pivotally connected to said lever arm 133 to be moved up and down by said lever 133 and having an opening surrounding the lens barrel, two shutter blades 153, 154 co-axially pivoted on the shutter plate and each having an opening, a shutter blade 154 having a projection, there being slow-shutter-speed mechanism and a spring arm 164 mounted on the pivot of the shutter blade 153 thereby only at substantially the end of the movement of said shutter blade 153 in one direction, to engage said slow-shutter-speed mechanism so as momentarily to hold the opening of the shutter blade 153 over the lens, and there also being an adjustable slow-speed timing cam 176 adapted to be engaged by an arm of the slow-speed shutter mechanism so as to vary the extent of the retarding action of said mechanism.

6. In a shutter movement for photographic cameras, a shutter plate whereon the operating parts are mounted, and whereon is mounted a lens barrel, a lever 133 pivoted upon said shutter plate and extending transversely thereof in close parallelism thereto, a lever member 139 pivotally connected to said lever arm 133 to be moved up and down by said lever 133 and having an opening surrounding the lens barrel, two shutter blades 153, 154 co-axially pivoted on the shutter plate and each having an opening, a shutter blade 154 having a projection, there being slow-shutter-speed mechanism and a spring arm 164 mounted on the pivot of the shutter blade 153, thereby, only at substantially the end of the movement of said shutter blade 153 in one direction, to engage said slow-shutter-speed mechanism so as momentarily to hold the opening of the shutter blade 153 over the lens, the said slow-speed shutter mechanism having an arm 173 adapted in operation to turn slowly in a contraclockwise direction, there being a retarding dog 169 of the slow-shutter-speed mechanism which co-acts with and becomes disengaged from the said spring arm 164, and, when so disengaged therefrom, allows the shutter blade 154 to close.

7. In a shutter movement for photographic cameras, a shutter plate whereon the operating parts are mounted, and whereon is mounted a lens barrel, a lever 133 pivoted upon said shutter plate and extending transversely thereof in close parallelism thereto, a lever member 139 pivotally connected to said lever arm 133 to be moved up and down by said lever 133 and having an opening surrounding the lens barrel, two shutter blades 153, 154 co-axially pivoted on the shutter plate and each having an opening, a shutter blade 154 having a projection, there being slow-shutter-speed mechanism and a spring arm 164 mounted on the pivot of the shutter blade 153, thereby, only at substantially the end of the movement of said shutter blade 153 in one direction, to engage said slow-shutter-speed mechanism so as momentarily to hold the opening of the shutter blade 153 over the lens, the said slow-shutter-speed mechanism having a rotatably adjustable timing cam 176, said slow-shutter-speed mechanism having a lever arm 174 to engage said timing cam 176 so as to limit the motion of a gear sector of the said slow-shutter-speed mechanism.

8. In a shutter movement for photographic cameras, a shutter plate whereon the operating parts are mounted and whereon is mounted a lens barrel, a lever arm 133 pivoted on said shutter plate and extending transversely thereof in close parallelism thereto, a lever member 139 pivotally connected to lever arm 133 to be moved up and down thereby and having an opening surrounding the lens barrel, two shutter blades 153, 154 co-axially pivoted and respectively provided with openings, a shutter operating lever arm 146 pivoted to said lever member 139 and having a formation to engage a formation on shutter blade 154 to move the latter, the said shutter blade 154 having a projection 157 to be engaged by said shutter blade 153, thereby to move said shutter blade 154.

9. In a shutter movement for photographic cameras, a shutter plate whereon the operating parts are mounted and whereon is mounted a lens barrel, a lever arm 133 pivoted on said shutter plate and extending transversely thereof in close parallelism thereto, a lever member 139 pivotally connected to lever arm 133 to be moved up and down thereby and having an opening surrounding the lens barrel, at least one shutter blade pivotally mounted on said shutter plate and a shutter operating lever arm 146 pivoted to said lever member 139 and having a formation to engage a formation on such shutter blade to move such shutter blade.

10. In a shutter movement for photographic cameras, a shutter plate whereon the operating parts are mounted and whereon is mounted a lens barrel, a lever arm 133 pivoted on said shutter plate and extending transversely thereof in close parallelism thereto, a lever member 139 pivotally connected to lever arm 133 to be moved up and down thereby and having an opening surrounding the lens barrel, two shutter blades 153, 154 co-axially pivoted on the said shutter plate and each having an opening, and a shutter operating lever arm 146 pivoted to the lever member 139 and having a formation 168 to engage a projection on the shutter blade 154 to move said shutter blade 154.

11. In a shutter movement for photographic cameras, a shutter plate whereon the operating parts are mounted and whereon is mounted a lens barrel, a lever arm 133 pivoted on said shutter plate and extending transversely thereof in close parallelism thereto, a lever member 139 pivotally connected to lever arm 133 to be moved up and down thereby and having an opening surrounding the lens barrel, two shutter blades 153, 154 co-axially pivoted on the said shutter plate and each having an opening, and a shutter operating lever arm 146 pivoted to the lever member 139 and having a notch 168 to engage a projection on the shutter blade 154 to move said shutter blade 154, the said lever arm 146 having a cam face, and a pin on the said shutter plate to engage said cam face 170 so as to release said lever arm 146 from the shutter blade 154 and permit the latter to return to its starting position.

12. In a shutter movement for photographic cameras, a shutter plate whereon the operating parts are mounted and whereon is mounted a lens barrel, a lever arm 133 pivoted on said shutter plate and extending transversely thereof in close parallelism thereto, a lever member 139 pivotally connected to lever arm 133 to be moved up and down thereby and having an opening surrounding the lens barrel, two shutter blades 153, 154 co-axially pivoted on the said shutter plate and each having an opening, slow-shutter-speed mechanism mounted on the shutter plate and a spring arm 164 mounted on the pivot of the shutter blade 153 and extending therefrom to engage, only at substantially the end of its movement in one direction, said slow-shutter-speed mechanism so as momentarily to hold the opening of the shutter blade 153 over the lens.

13. In a shutter movement for photographic cameras, a shutter plate whereon the operating parts are mounted and whereon is mounted a lens barrel, a lever arm 133 153 pivoted on said shutter plate and extending transversely thereof in close parallelism thereto, a lever member 139 pivotally connected to lever arm 133 to be moved up and down thereby and having an opening surrounding the lens barrel, two shutter blades 153, 154 co-axially pivoted on the said shutter plate and each having an opening, slow-shutter-speed mechanism mounted on the shutter plate and having a dog 169 and an arm 164 mounted on the pivot of the shutter blade 153 and extending therefrom to engage, only at substantially the end of its movement in one direction, the said dog so as momentarily to hold the opening of the shutter blade 153 over the lens.

14. In a shutter movement for photographic cameras, a shutter plate whereon the operating parts are mounted and whereon is mounted a lens barrel, a lever arm 133 153 pivoted on said shutter plate and extending transversely thereof in close parallelism thereto, a lever member 139 pivotally connected to lever arm 133 to be moved up and down thereby and having an opening surrounding the lens barrel, two shutter blades 153, 154 co-axially pivoted on the shutter plate and each having an opening, said shutter blade 154 having a projection, and a shutter operating lever arm 146 pivoted to the lever member 139 and having a notch 168 to engage periodically said projection on the shutter blade 154, and means to disengage said notch and projection, whereby the disengaging of the notch 168 from the shutter blade 154 allows the said blade 154 to return to its starting position and the opening of the shutter blade 153 at such time registers with the lens.

15. In a shutter movement for photographic cameras, a shutter plate whereon the operating parts are mounted and whereon is mounted a lens barrel, a lever arm 133 153 pivoted on said shutter plate and extending transversely thereof in close parallelism thereto, a lever member 139 pivotally connected to lever arm 133 to be moved up and down thereby and having an opening surrounding the lens barrel, two shutter blades 153, 154 co-axially pivoted on the shutter plate and each having an opening said shutter blade 154 having a projection, and a shutter operating lever arm 146 pivoted to the lever member 139 and having a notch 168 to engage periodically said projection on the shutter blade 154, and means to disengage said notch and projection, whereby the disengaging of the notch 168 from the shutter blade 154 allows the said blade 154 to return to its starting position and the opening of the shutter blade 153 at such time registers with the lens, and slow-shutter-speed mechanism mounted upon the shutter plate and co-acting with the said shutter blade 153 to retard its movement as the lens is uncovered and exposure is made.

16. In a shutter movement for photographic cameras, a shutter plate whereon the operating parts are mounted and whereon is mounted a lens barrel, a lever arm 133 153 pivoted on said shutter plate and extending transversely thereof in close parallelism thereto, a lever member 139 pivotally connected to lever arm 133 to be moved up and down thereby and having an opening surrounding the lens barrel, two shutter blades 153, 154 co-axially pivoted on the shutter plate and each having an opening, said shutter blade 154 having a projection, and a shutter operating lever arm 146 pivoted to the lever member 139 and having a notch 168 to engage periodically said projection on the shutter blade 154, and means to disengage said notch and projection, whereby the disengaging of the notch 168 from the shutter blade 154 allows the said blade 154 to return to its starting position and the opening of the shutter blade 153 at such time registers with the lens, and slow-shutter-speed mechanism mounted upon the shutter plate and co-acting with the said shutter blade 153 to retard its movement as the lens is uncovered and exposure is made, the said slow-shutter-speed mechanism for that purpose having an arm 173 providing a retarding dog, and an arm 164 of the shutter blade 153 to be engaged by said dog for such retardation.

17. In a shutter movement for photographic cameras, a shutter plate whereon the operating parts are mounted and whereon is mounted a lens barrel, a lever arm 133 153 pivoted on said shutter plate and extending transversely thereof in close parallelism thereto, a lever member 139 pivotally connected to lever arm 133 to be moved up and down thereby and having an opening surrounding the lens barrel, two shutter blades 153, 154 co-axially pivoted on the shutter plate and each having an opening, said shutter blade 154 having a projection, and a shutter operating lever arm 146 pivoted to the lever member 139 and having a notch 168 to engage periodically said projection on the shutter blade 154, and means to disengage said notch and projection, whereby the disengaging of the notch 168 from the shutter blade 154 allows the said blade 154 to return to its starting position and the opening of the shutter blade 153 at such time registers with the lens, and slow-shutter-speed mechanism mounter upon the shutter plate and co-acting with the said shutter blade 153 to retard its movement as the lens is uncovered and exposure is made, and an adjustable slow-speed timing cam, said slow-speed-shutter mechanism having an arm to engage said timing cam so as to vary the extent of the retarding action.

18. In a combined film-feeding and shutter-movment for photographic cameras, a shutter plate whereon the operating parts are mounted and whereon is mounted a lens barrel, a lever arm 133 pivoted on said shutter plate and extending transversely thereof in close parallelism thereto, means to connect said lever arm 133 to a manually operating part, including an operating arm 135 also in close parallelism to said shutter plate, and a pin 28 moved by manually controlled means, which pin is directly engaged by said operating arm 135, a lever member 139 pivotally connected to said lever arm 133 to be moved up and down thereby and having an opening surrounding the lens barrel, at least one shutter blade pivotally mounted on the shutter plate and controlled by said lever member 139, and a film feed bar 95 operatively connected with the said lever member 139, and a ratchet feed arm 124 of the film magazine directly engaging said film feed bar 95.

19. In a combined film-feeding and shutter-movement for photographic cameras, a shutter plate whereon the operating parts are mounted and whereon is mounted a lens barrel, a lever arm 133 pivoted on said shutter plate and extending transversely thereof in close parallelism thereto, means to connect said lever arm 133 to a manually operating part, including an operating arm 135 also in close parallelism to said shutter plate, and a pin 28 moved by manually controlled means, which pin is directly engaged by said operating arm 135, a lever member 139 pivotally connected to said lever arm 133 to be moved up and down thereby and having an opening surrounding the lens barrel, two shutter blades 153, 154 co-axially pivoted and respectively provided with openings, a shutter operating lever arm 146 pivoted to said lever member 139 and having means to engage and move said shutter plate 154, means to cause movement of the shutter blade 153 by movement of the shutter blade 154, and a film feed bar 95 operatively connected with the said lever member 139.

EDSON S. HINELINE.

CERTIFICATE OF CORRECTION.

Patent No. 2,353,893.　　　　　　　　　　　　　　July 18, 1944.

EDSON S. HINELINE.

It is hereby certified that error appears in the printed specification of the above numbered patent requiring correction as follows: Page 6, second column, lines 14, 32, 53, and page 7, first column, lines 3 and 32, strike out the numeral "153"; page 7, first column, line 50, for "mounter" read --mounted--; and that the said Letters Patent should be read with this correction therein that the same may conform to the record of the case in the Patent Office.

Signed and sealed this 26th day of September, A. D. 1944.

Leslie Frazer (Seal)　　　　　　　　　　　　Acting Commissioner of Patents.